United States Patent [19]

Hostert, Jr. et al.

[11] Patent Number: 5,564,168

[45] Date of Patent: Oct. 15, 1996

[54] VERTICAL MULTI-DRILL SPINDLE-FLUID ADAPTER

[75] Inventors: Arthur B. Hostert, Jr., New Lenox; Lynn M. Lusciatti, Joliet; Louis G. Porro, Channahon; Jerry R. Wilson, Wilmington, all of Ill.

[73] Assignee: Caterpillar Inc., Peoria, Ill.

[21] Appl. No.: 416,566

[22] Filed: Apr. 4, 1995

[51] Int. Cl.⁶ ................................................. B23Q 11/10
[52] U.S. Cl. ................ 29/50; 29/DIG. 87; 184/6.14; 408/57; 409/136
[58] Field of Search ........................ 29/50, 55, 39, 29/DIG. 87; 409/135, 136; 408/57, 56, 42; 184/31, 39, 6.14; 82/159

[56] References Cited

U.S. PATENT DOCUMENTS

| 3,264,906 | 8/1966 | Swords | 408/59 X |
|---|---|---|---|
| 4,164,879 | 8/1979 | Martin | 82/159 |
| 4,442,576 | 4/1984 | Kitamura | 29/39 |

FOREIGN PATENT DOCUMENTS

| 3277410 | 12/1991 | Japan | 29/50 |

*Primary Examiner*—William R. Briggs
*Attorney, Agent, or Firm*—Kenneth A. Rhoads

[57] ABSTRACT

An adapter is provided for connecting a vertical multi-drill with drill bits having thru-shank cooling fluid passageways.

5 Claims, 1 Drawing Sheet

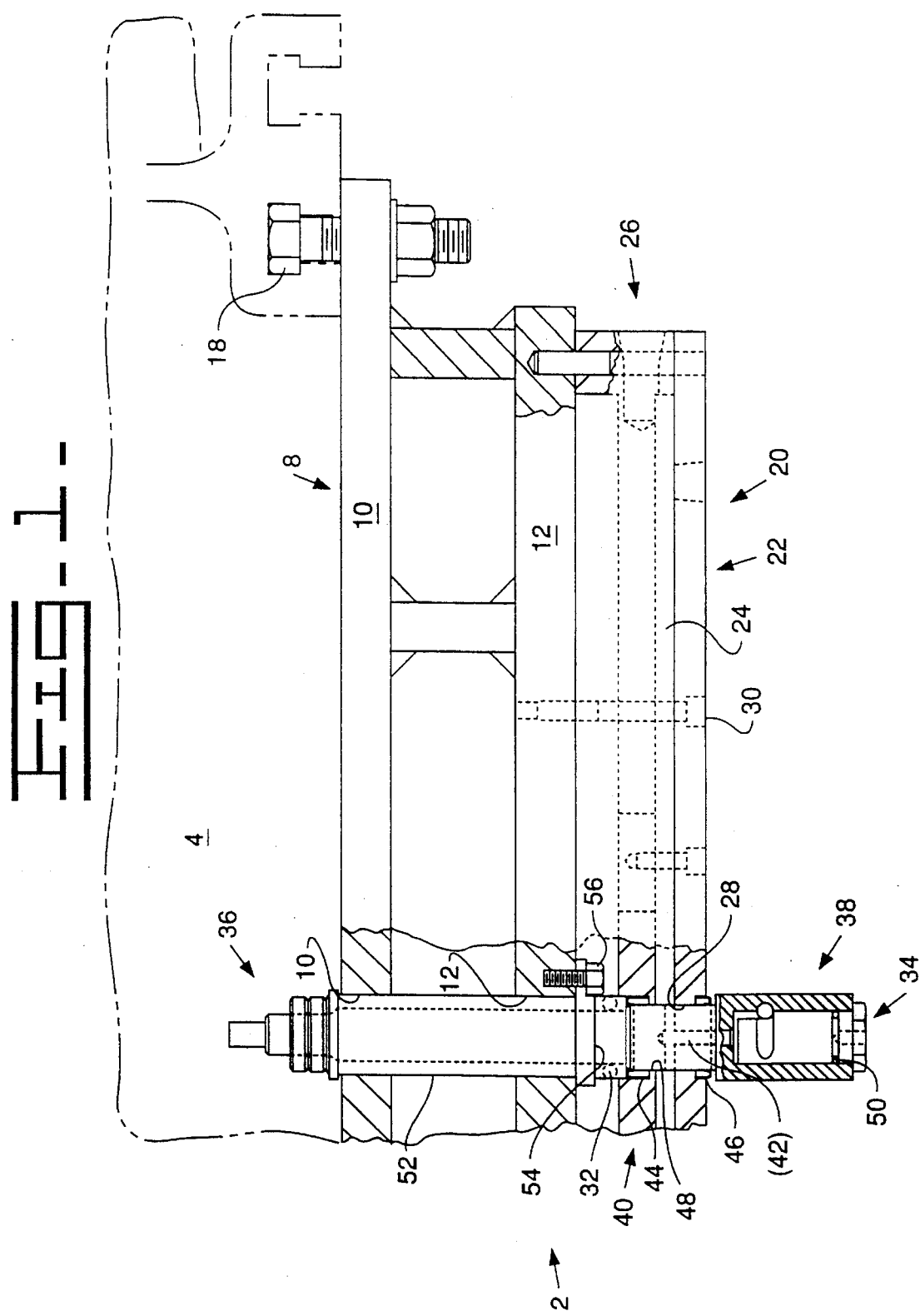

VERTICAL MULTI-DRILL SPINDLE-FLUID ADAPTER

TECHNICAL FIELD

The present invention relates to a vertical multi-drill and more particularly to a spindle-fluid adapter for using drill bits having thru-shank cooling fluid passageways.

BACKGROUND ART

In vertical drilling innovation, early drill presses had a stream of cooling fluid passing over the outside of the drill bit and onto the work piece being drilled. Later, drill presses were invented which carried a plurality of drill bits with associated external fluid streams so that a plurality of holes could be drilled simultaneously. Further technological advances provided drill bits having an internal cooling fluid passage which carried the fluid to the tip of the drill bit where the temperatures were greatest.

These improved drill bits were most useful in vertically, drilling a hole in a workpiece, but required fluid conduit systems which did not conveniently lend themselves to multi-bit drilling. Such improved drill bits did however make considerable advancements in drilling speed.

The present invention is directed to overcome one or more of the problems, as set forth above, by providing an adapter which will permit the use of improved drill bits, having internal cooling fluid passageways, with vertical multi-drills which used external cooling fluid systems.

DISCLOSURE OF THE INVENTION

In one aspect of the invention, a spindle-fluid adapter is provided which is connectable to a vertical multi-drill for utilizing drill bits having thru-shank fluid passageways. The adapter has a connection element which has first and second spaced apart opposed mounting plates each having a plurality of respective, generally coaxial openings. The first mounting plate is connectable to the vertical multi-drill. A cooling fluid header is provided which has a housing, a chamber, and an inlet in communication with the chamber. The header has a plurality of spaced apart openings extending through and generally coaxially aligned with the openings of the connecting element and is connected to the second mounting plate of the connecting element. A plurality of thrust bearings are removably connected to the connecting element second mounting plate and extend into a respective header opening.

A plurality of spindles are provided each of which has first and second end portions and a middle portion. The spindles each extend through a respective opening of the connecting element, a respective thrust bearing, a respective opening of the header and the header chamber. The spindle first end portion is connectable to a power means and rotatable in said openings, said second end portion is releasably connectable to a drill bit, and said middle spindle portion has a fluid passageway opening on one end in communication with header chamber and at the other end in communication with a fluid passageway of a respective drill bit in the installed position of a drill bit in said spindle.

BRIEF DESCRIPTION OF THE DRAWINGS

The drawing is a diagrammatic view of the adapter of this invention.

BEST MODE FOR CARRYING OUT THE INVENTION

Referring to the drawing, a spindle-fluid adapter 2 is connectable to a vertical multi-drill 4 for utilizing drill bits (not shown) 6 having thru-shank fluid passageways.

A connecting element 8 has first and second spaced apart opposed mounting plates 10,12 each having a plurality of respective, generally coaxial openings 14,16. For brevity, only a portion of the adapter 2 and one set of openings 10,12 and associated elements is shown in the drawing. The first mounting plate is connectable to the vertical multi-drill 4 by bolts 18 or other means known in the art.

A cooling fluid header 20 has a housing 22, a chamber 24, and an inlet 26 in communication with the chamber 24. The header 20 has a plurality of spaced apart openings 28 extending through and generally coaxially aligned with the openings 14.16 of the connecting element 8. The header 20 is connected to the second mounting plate 12 of the connecting element 8 by bolts 30 or other means known in the art.

A plurality of thrust bearings 32 are each removably connected to the connecting element second mounting plate 12 and extend into a respective header opening 28.

A plurality of spindles 34 are provided. Each spindle 34 has first and second end portions 36,38 and a middle portion 40. Each spindle 34 extends through respective openings 14,16 of the connecting element 8, a respective thrust bearing 32, a respective opening 28 of the header 20, and the header chamber 24. The spindle first end portion 36 is connectable to power means (not shown) for rotating the spindle 34 and associated drill bit 6, as is known in the art. The second end portion 38 of the spindle 34 are releasable connectable to a respective drill bit. The middle portion 40 of the spindle 34 has a fluid passageway 42. The passageway 42 opens on one end in communication with the header chamber 24 and at their other end in communication with a fluid passageway (not shown) of a respective drill bit in the installed position of a drill bit in said spindle second end portion 38.

In the preferred embodiment of this invention, a pair of seals 44,46 are positioned in an annulus 48 formed between the spindle 34 and its respective header opening 28 with said seal pair 44,46 being located on opposed sides of the header chamber 24. There is preferably also a seal 50 positioned about an inner periphery of the second end portion 38 of the spindle 34 and being adapted to seal an annulus (not shown) formed between the spindle 34 and a drill bit insertable therein.

A sleeve assembly 52 is positioned about the first end portion 36 of each spindle 34 adjacent the first and second plates 10,12 of the connecting element 8. Also, preferably, the thrust bearing 32 has a shoulder 54 and a threaded member 56 mateable with threads formed in the second plate 12 of the connecting element 8 and is adapted to contact the thrust bearing shoulder 54 and attach and maintain the thrust bearing 32 and sleeve assembly 52 with the connecting element 8.

INDUSTRIAL APPLICABILITY

In the operation of the adapter of this invention, the adapter can be connected to a vertical multi-drill and a cooling fluid source and thereby use drill bits having thru-shank fluid passageways. The cooling fluid will pass from the inlet 26, thorough the chamber 24 and be dispersed to a plurality of respective spindle passageways 42, through a respective drill bit and outwardly from the working end of the bit.

Other aspects, objects and advantages of this invention can be obtained from a study of the drawings, the disclosure and the appended claims.

We claim:

1. A spindle-fluid adapter connectable to a vertical multi-drill for utilizing drill bits having thru-shank fluid passageways, comprising:

a connecting element having first and second spaced apart opposed mounting plates each having a plurality of respective, generally coaxial openings, said first mounting plate being connectable to the vertical multi-drill;

a cooling fluid header having a housing, a chamber, an inlet in communication with the chamber, said header having a plurality of spaced apart openings extending through and generally coaxially aligned with the openings of the connecting element and being connected to the second mounting plate of the connecting element;

a plurality of thrust bearings each being removably connected to the connecting element second mounting plate and extending into a respective header opening;

a plurality of spindles, each having first and second end portions and a middle portion, said spindles each extending through a respective opening of the connecting element, a respective thrust bearing, a respective opening of the header and the header chamber, said spindle first end portion being connectable to power means and rotatable in said openings, said second end portion being releasably connectable to a respective drill bit, and said middle spindle portion having a fluid passageway opening on one end in communication with the header chamber and at the other end in communication with a fluid passageway of a respective drill bit in the installed position of a drill bit in said spindle second end portion.

2. An adapter, as set forth in claim 1, including a pair of seals each positioned in an annulus formed between each spindle and its respective header opening with said seal pair being located on opposed sides of the header chamber.

3. An adapter, as set forth in claim 2, including a seal positioned about an inner periphery of the second end portion of spindle and being adapted to seal an annulus formed between the spindle and a drill bit insertable therein.

4. An adapter, as set forth in claim 1, including a sleeve assembly positioned about the first end portion of each spindle adjacent the first and second plates of the connecting element.

5. An adapter, as set forth in claim 4, wherein the thrust bearing has a shoulder and including a threaded member mateable with threads formed in the second plate of the connecting element and being adapted to contact the thrust bearing shoulder and attaching and maintaining the thrust bearing and sleeve assembly with the connecting element.

* * * * *